United States Patent
Salasoo et al.

(10) Patent No.: US 8,063,609 B2
(45) Date of Patent: Nov. 22, 2011

(54) METHOD AND SYSTEM FOR EXTENDING LIFE OF A VEHICLE ENERGY STORAGE DEVICE

(75) Inventors: Lembit Salasoo, Schenectady, NY (US); Robert Dean King, Schenectady, NY (US); Charles Iacovangelo, Clifton Park, NY (US); Wolfgang Daum, Erie, PA (US)

(73) Assignee: General Electric Company, Schenectady, NY (US)

( * ) Notice: Subject to any disclaimer, the term of this patent is extended or adjusted under 35 U.S.C. 154(b) by 643 days.

(21) Appl. No.: 12/179,199

(22) Filed: Jul. 24, 2008

(65) Prior Publication Data

US 2010/0019718 A1    Jan. 28, 2010

(51) Int. Cl.
*H02J 7/00* (2006.01)
(52) U.S. Cl. .................. 320/134; 320/103; 320/128
(58) Field of Classification Search .................. 320/103, 320/134, 128
See application file for complete search history.

(56) References Cited

U.S. PATENT DOCUMENTS

| | | | |
|---|---|---|---|
| 4,435,675 A | 3/1984 | Adams | |
| 5,349,535 A | 9/1994 | Gupta | |
| 5,373,195 A | 12/1994 | De Doncker et al. | |
| 5,467,006 A | 11/1995 | Sims | |
| 5,623,194 A | 4/1997 | Boll et al. | |
| 5,659,240 A | 8/1997 | King | |
| 5,731,685 A | 3/1998 | Jones | |
| 5,778,326 A | 7/1998 | Moroto et al. | |
| 5,869,950 A * | 2/1999 | Hoffman et al. | 320/103 |
| 6,265,847 B1 * | 7/2001 | Goerke | 320/126 |
| 6,281,598 B1 | 8/2001 | King et al. | |
| 6,291,973 B1 * | 9/2001 | Lee | 320/128 |
| 6,362,596 B1 | 3/2002 | Brotto | |
| 6,470,983 B1 | 10/2002 | Amano et al. | |
| 6,507,127 B1 | 1/2003 | Amano et al. | |
| 6,515,456 B1 | 2/2003 | Mixon | |
| 6,771,047 B1 * | 8/2004 | Ogonowsky | 320/128 |
| 7,049,792 B2 | 5/2006 | King | |
| 7,078,877 B2 | 7/2006 | Salasoo et al. | |
| 7,525,290 B2 | 4/2009 | Miyata | |
| 2002/0145404 A1 | 10/2002 | Dasgupta et al. | |
| 2009/0115371 A1 * | 5/2009 | Chawla et al. | 320/134 |

FOREIGN PATENT DOCUMENTS

| | | |
|---|---|---|
| GB | 2 273 614 | 6/1994 |
| WO | 02/081255 | 10/2002 |

OTHER PUBLICATIONS

ISA European Patent Office, International Search Report of PCT/US2009/049537, Sep. 23, 2009, WIPO, 4 pages.

(Continued)

*Primary Examiner* — M'Baye Diao
(74) *Attorney, Agent, or Firm* — Alleman Hall McCoy Russell & Tuttle LLP (57) ABSTRACT

Methods and systems are provided for controlling a power transfer rate in to and/or out of a vehicle energy storage device to affect a current state of charge of the energy storage device. The vehicle may be on a mission comprising a plurality of future power transfer opportunities. In one example, the method comprises adjusting the power transfer rate based on an estimated duration of a future power transfer opportunity. Further, the method may include, if the estimated duration of the future power transfer opportunity is different from a predetermined threshold, changing the power transfer rate at the future power transfer opportunity. The method allows the operating life of the energy storage device to be extended.

24 Claims, 6 Drawing Sheets

OTHER PUBLICATIONS

Kumar, Ajith K., "Method and System for Control of a Vehicle Energy Storage Device," U.S. Appl. No. 12/179,188, filed Jul. 24, 2008, 28 pages.

Office action and response of U.S. Appl. No. 12/179,188, Office action dated Nov. 23, 2010, Response submitted Feb. 23, 2011, 33 pages.

Office action and response of U.S. Appl. No. 12/179,188, Office action dated Jul. 30, 2010, Response submitted Sep. 30, 2010, 30 pages.

Office action and response of U.S. Appl. No. 12/179,188, Office action dated Mar. 4, 2010, Response submitted Jun. 4, 2010, 29 pages.

Office action of U.S. Appl. No. 12/179,188, Office action dated May 24, 2011, Response to Office action not yet submitted, 8 pages.

* cited by examiner

METHOD AND SYSTEM FOR EXTENDING LIFE OF A VEHICLE ENERGY STORAGE DEVICE

FIELD

The subject matter disclosed herein relates to a method and system for improving the performance of a vehicle energy storage device to thereby extend the operating life of the device.

BACKGROUND

Electric and hybrid electric vehicles, such as locomotives, operate with on-board rechargeable electrical energy storage devices. The energy storage devices may include one or more types of batteries, super-capacitors, utracapacitors, and flywheel systems.

During operation, the energy storage devices experience frequent cycles of periodic charging and discharging. Further, the operating life and performance characteristics of such devices can be affected by the rate and depth of charging/discharging and/or the current level at which charging/discharging occurs. Use of faster and deeper rates and higher current levels during charging/discharging events adversely affect the operating life and storage capacity of an energy storage device. The age of the device, frequency of usage, and temperature of storage are some additional parameters affecting its performance. Reduced performance of electrical energy storage devices in turn may affect the performance and fuel efficiency of the electric vehicle (or hybrid electric vehicle) in which they are used.

BRIEF DESCRIPTION OF THE INVENTION

Methods and systems are provided for controlling a power transfer rate in to and/or out of a vehicle energy storage device to affect a current state of charge of the energy storage device. In one embodiment, the method comprises adjusting the power transfer rate based on an estimated duration of a future power transfer opportunity. Further, the method may include, if the estimated duration of the future power transfer opportunity is different from a predetermined threshold, changing the power transfer rate at the future power transfer opportunity. Additionally, or alternatively, the power transfer rate can be further adjusted based on a change in mission, or changes in the duration of the opportunity.

In one example, it may be predetermined that an upcoming power transfer opportunity is a long duration charging opportunity. Accordingly, the power transfer rate for the upcoming charging opportunity may be assigned a value below a maximum allowed charging rate. Additionally, the energy storage device may be discharged to a lower initial state of charge in the preceding discharging opportunity. In this way, the energy storage device may be completely charged, albeit at a slower rate, by the end of the long duration charging opportunity, but not earlier. In another example, it may be predetermined that an upcoming power transfer opportunity is a short duration charging opportunity. Accordingly, the power transfer rate for the upcoming charging opportunity may be assigned a higher, or even maximal value. Additionally, the energy storage device may be discharged to a higher state of charge in the preceding discharging opportunity. Consequently, the energy storage device may be completely charged, albeit at a faster rate, by the end of the shorter duration charging opportunity, but not earlier. In this way, it is possible to take advantage of a priori information about future charging and discharging opportunities (e.g., information known, deduced, and/or estimated before a future charging or discharging opportunity) to better utilize longer charging durations through a lower charging rate and through prior discharging to a lower initial state of charge. Such operation not only provides a more efficient power transfer, but also reduces degradation of the energy storage device in the vehicle, while still reaching the desired state of charge at the conclusion of the opportunity.

With a priori information regarding the plurality of future charging and discharging opportunities, and durations thereof, in a given vehicle mission, it may be further possible to customize the power transfer profile for each future power transfer opportunity. In one example, by adjusting the power transfer rate in to and/or out of an energy storage device to affect a current state of charge and by adjusting the power transfer rate based on an estimated duration of a future power transfer opportunity, over-charging and under-charging may be avoided, thereby extending the life of the device. Additionally, in another example, by breaking a bulk power transfer event of the energy storage device into smaller power transfer opportunities, and by further adjusting the power transfer profile during each of those upcoming opportunities based on an operating condition of the energy storage device, such as a device age, temperature, capacity, etc, the life of the device may be extended and the performance optimized. Additionally, in another example, by breaking the power transfer event into separate voltage and current demands based on an operating condition of the energy storage device, such as a device age, temperature, capacity, state of charge, and the like, the life of the device may be extended and the performance optimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Vehicles, such as locomotives operating with rechargeable electrical energy storage devices, may be configured with integrated energy management systems that control power transfer profiles to and from the energy storage device. The power transfer profile may be controlled based not only on the operating condition of the energy storage device, but also responsive to charging/discharging opportunities available during a mission and other inherent characteristics of the device that may affect the device's performance. One example is illustrated with reference to FIG. 1 wherein an energy management system monitors the operating conditions of a locomotive's on-board electrical energy storage device and accordingly adjusts the charging/discharging profile so as to maximize the operating life of the device. The charging cycle of the energy storage device may be optimized into a plurality of sub-charging cycles that match the expected performance and life of the device.

Figure 2:
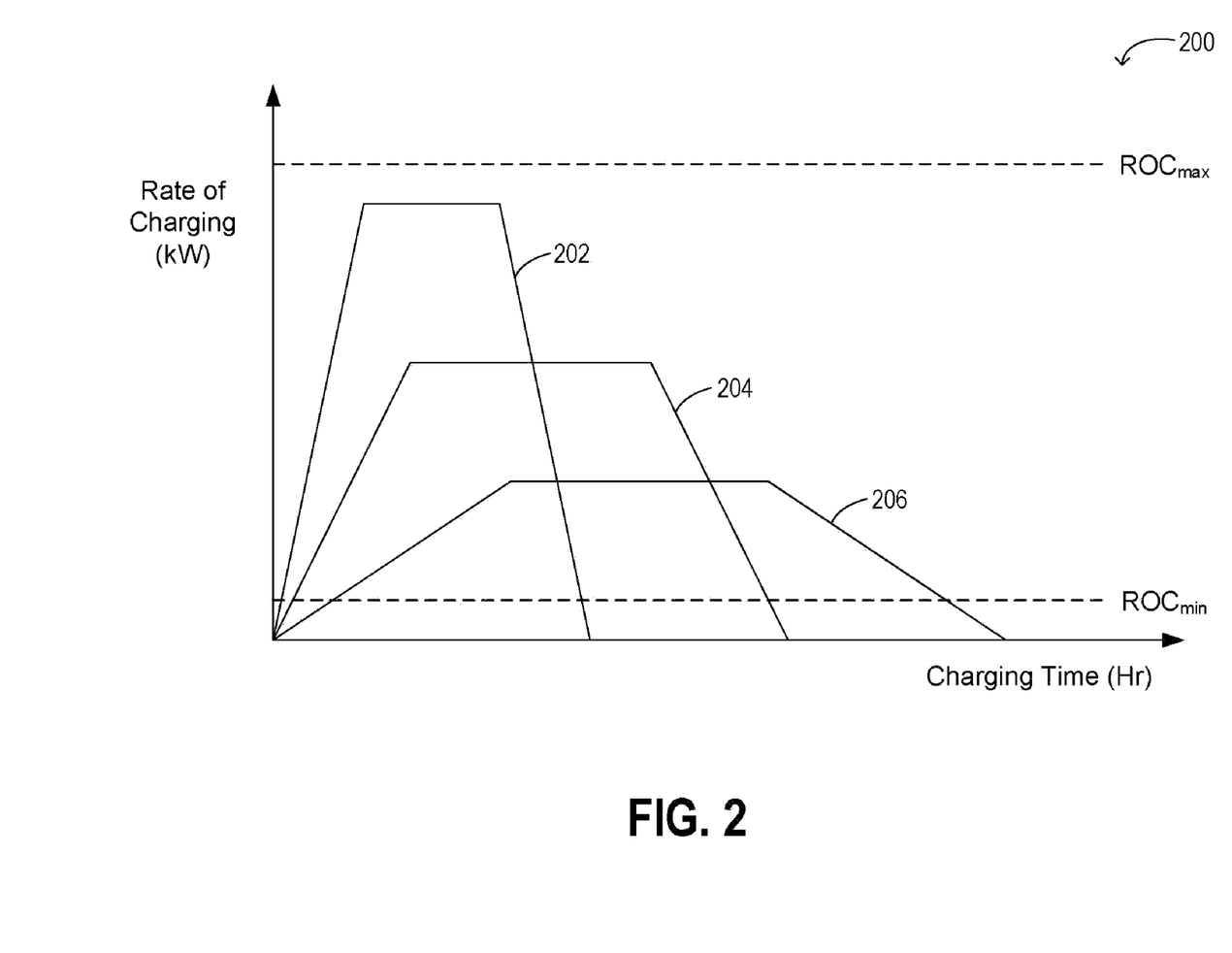
FIG. 2 shows an example map of alternate power transfer profiles that may be used for a given desired state of charge.
Figure 3:
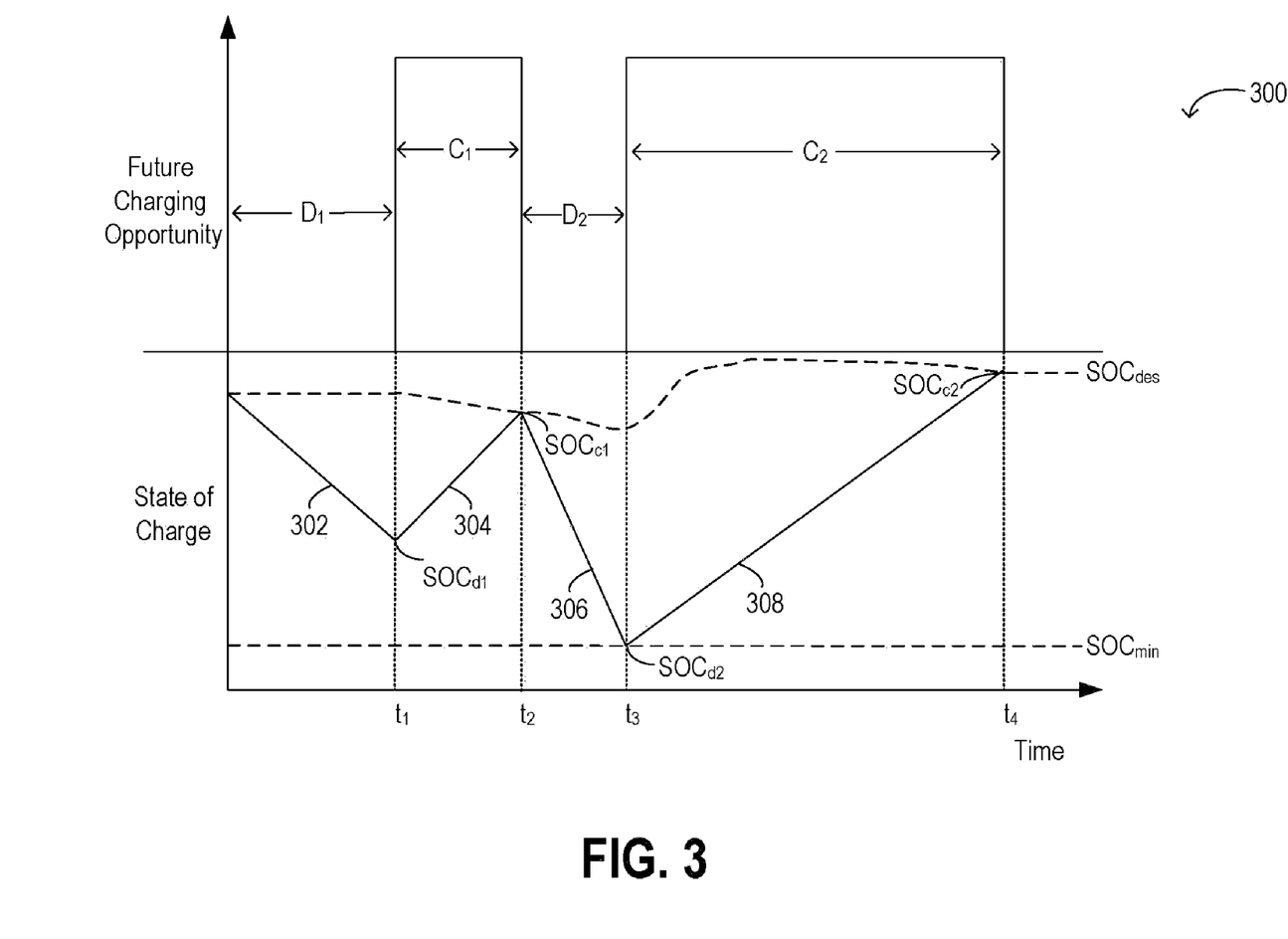
FIG. 3 shows an example map depicting changes in power transfer profiles responsive to changes in future power transfer opportunities.
Figure 4:
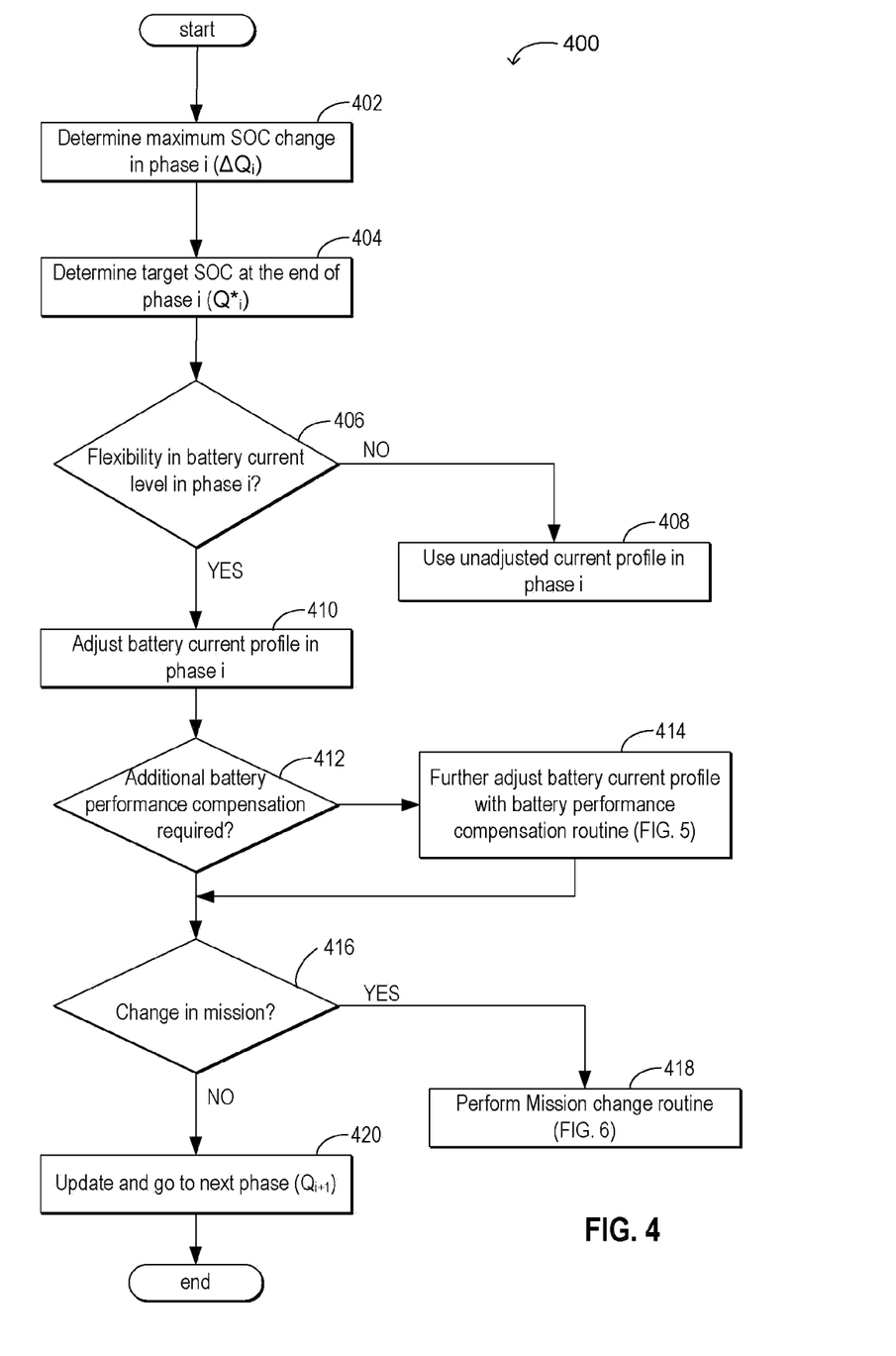
FIG. 4 shows a high level flow chart for selecting a power transfer profile according to the present disclosure.
Figure 5:
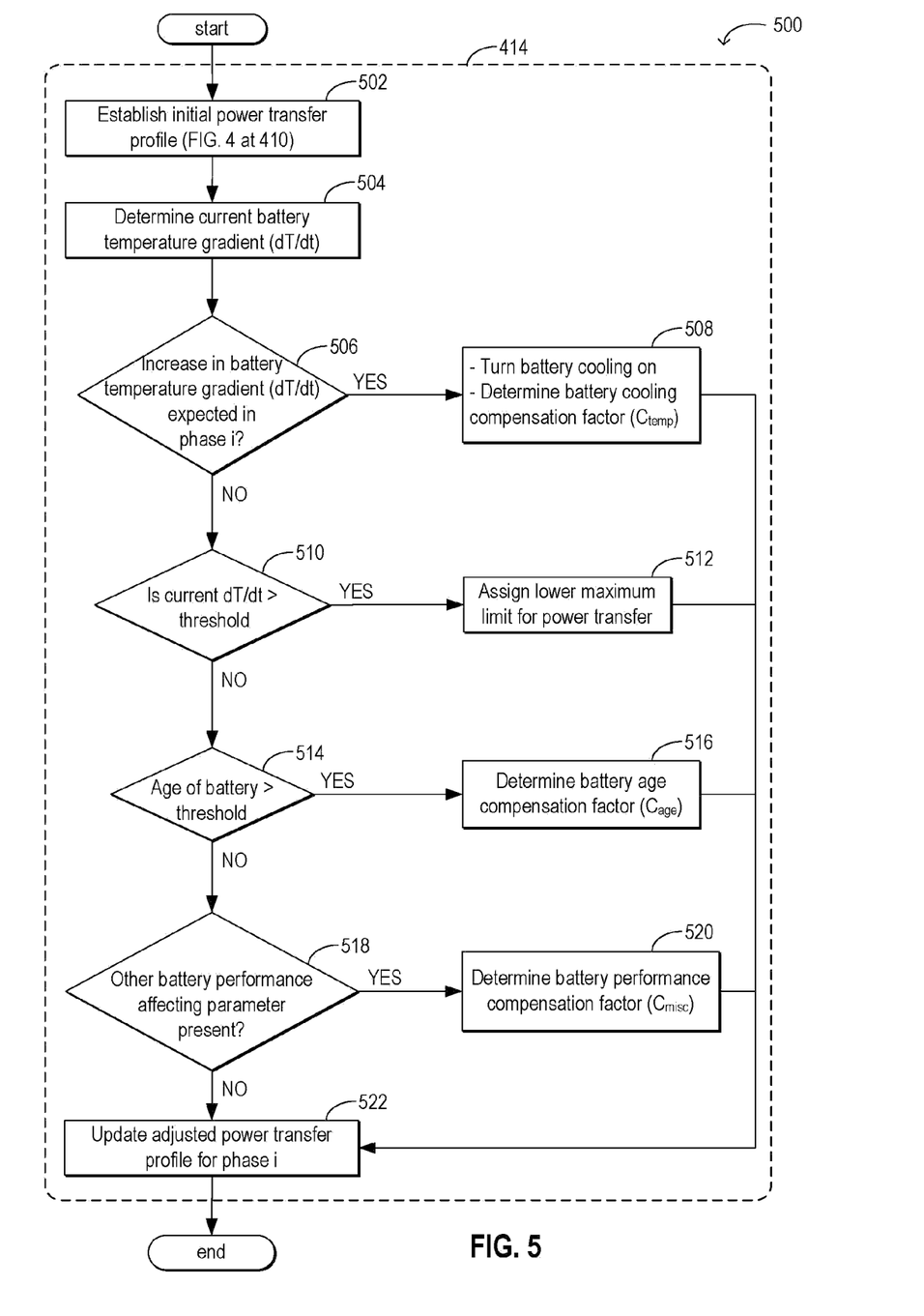
FIG. 5 shows a high level flow chart for further adjusting a selected power transfer profile in consideration of alternate performance affecting parameters.
Figure 6:
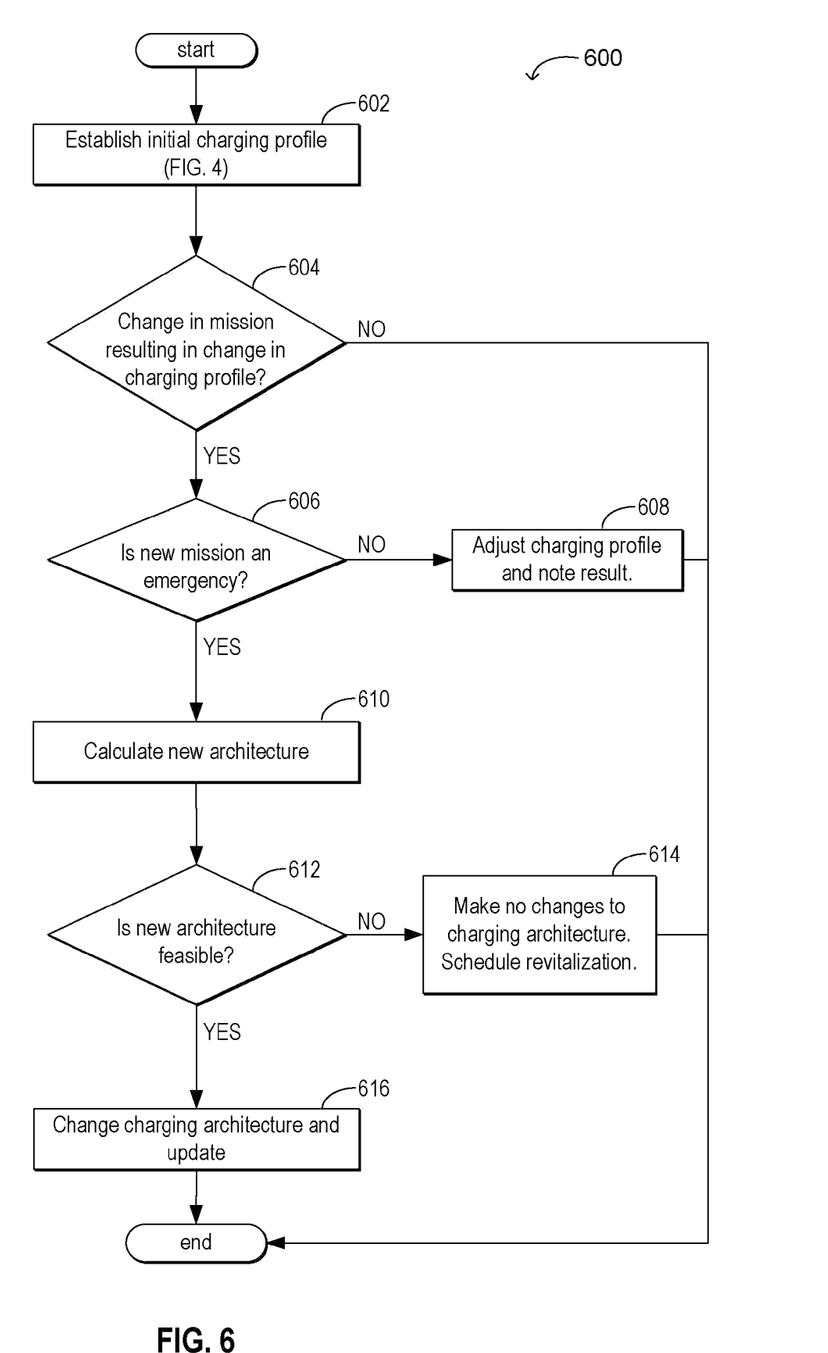
FIG. 6 shows a high level flow chart for adjusting a power transfer profile responsive to sudden changes in a vehicle's mission.

As illustrated in FIGS. 2-3, the system may choose from a variety of charging profiles based on the duration of both the upcoming charging opportunity and the preceding discharging opportunity. The selected profile may be determined by performing a charging/discharging profile routine, for example as depicted in FIG. 4, such that the energy storage device's performance may be optimized. Herein, the energy management system may be configured to receive information pertaining to a mission profile of the vehicle (for example from a position identification system) and to adjust the charging/discharging profile of the energy storage device according to each future charging/discharging opportunity of the mission. The energy management system may be configured to further adjust the profile in consideration of alternate performance affecting characteristics, such as an age and temperature of the device, by performing a performance-adjustment routine, for example as depicted in FIG. 5. In the event of a sudden change in mission, the initially established charging profile and base architecture may be still further adjusted by performing a mission-adjustment routine, for example as depicted in FIG. 6.

By customizing the operation of the energy storage device responsive to the device's operating condition and the availability of potential charging/discharging opportunities, an efficient power transfer may be ensured and premature degradation of the device may be averted. Further, by adjusting the power transfer rate of the device in a bulk charging cycle into appropriate sub-charge cycles, the overall life and capacity of the device may be improved.

Figure 1:
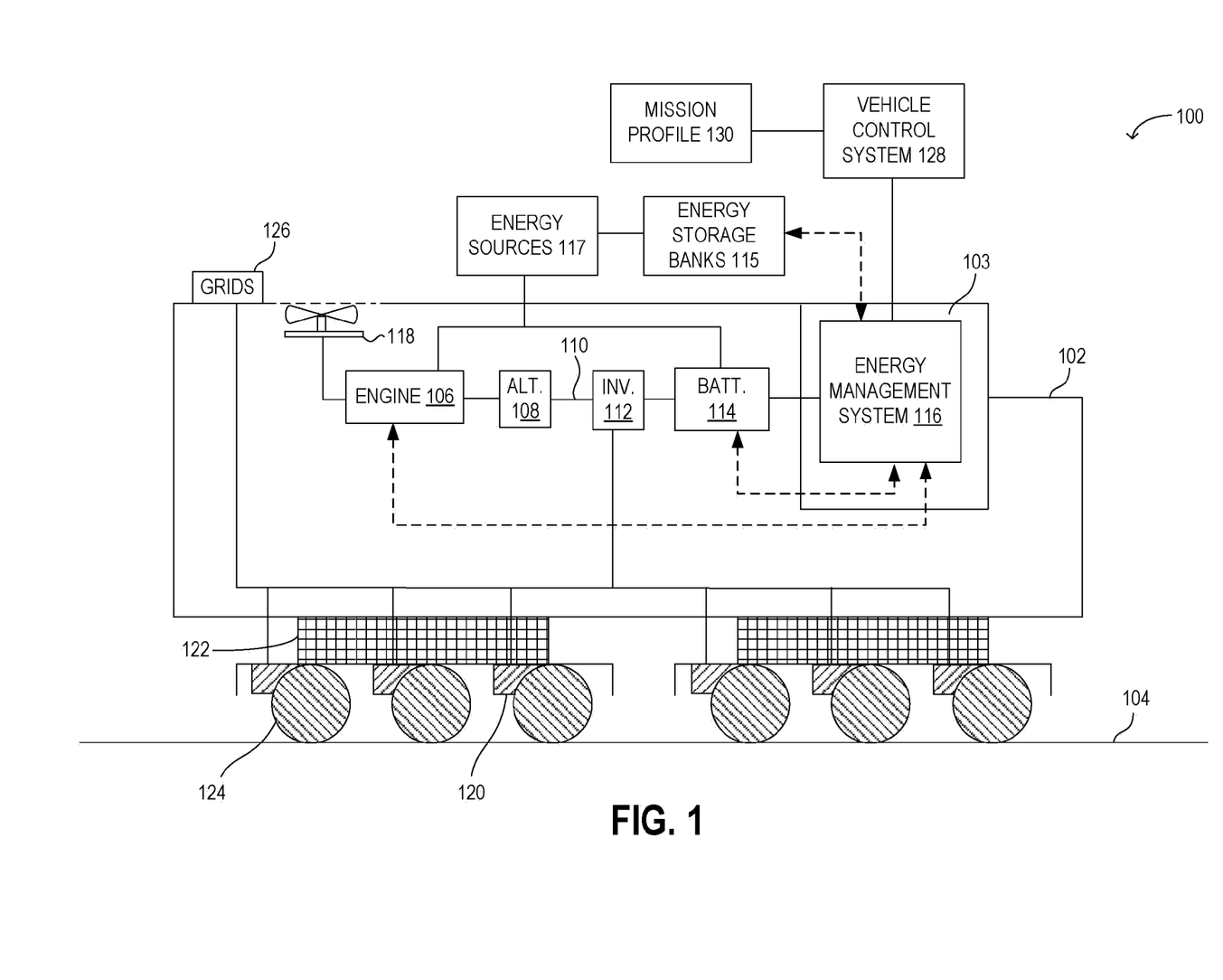
FIG. 1 shows an example embodiment of a diesel-electric locomotive with an energy management system according to the present disclosure.

FIG. 1 is a block diagram of an example hybrid vehicle system, herein depicted as locomotive 100, configured to run on track 104. As depicted herein, in one example, the locomotive is a diesel electric vehicle operating a diesel engine 106 located within a main engine housing 102. However, in alternate embodiments of locomotive 100, alternate engine configurations may be employed, such as a gasoline engine or a biodiesel or natural gas engine, for example. It will be appreciated that the vehicle may alternatively be an on-road truck, bus, van, or a passenger vehicle, an off-highway vehicle (OHV) such as a large excavator, excavation dump truck, and the like. Further, the vehicle system may be a hybrid electric propulsion system such as may be used in marine and stationary applications, including crane and winch systems for loading/unloading cargo.

Locomotive operating crew and electronic components involved in locomotive systems control and management, such as energy management system 116, may be housed within a locomotive cab 103. Energy management system 116 may comprise a plurality of microprocessors and/or computers. Energy management system 116 may communicate with a vehicle control system 128. Vehicle control system 128 may be an on-board control system also located in locomotive cab 103. Alternatively, the vehicle control system may be remotely located. Vehicle control system 128 and/or energy management system 116 may further include a position identification system, such as a global positioning system (GPS), inertia based location system, wayside based location system and the like, enabling the system to be aware of current and future mission profiles 130.

The diesel engine 106 generates a torque that is transmitted to an alternator 108 along a drive shaft (not shown). The generated torque is used by alternator 108 to generate electricity for subsequent propagation of the vehicle. Locomotive engine 106 may be run at a constant speed, or at variable speed, generating horsepower output based on operational demand. The electrical power generated in this manner may be referred to as the prime mover power. Auxiliary alternators generating smaller amounts of power (auxiliary power) for auxiliary components such as air conditioning, heating, etc., may be optionally provided in alternate embodiments of locomotive 100. The electrical power may be transmitted along an electrical bus 110 to a variety of downstream electrical components. Based on the nature of the generated electrical output, the electrical bus may be a direct current (DC) bus (as depicted) or an alternating current (AC) bus.

Alternator 108 may be connected in series to one or more rectifiers (not shown) that convert the alternator's electrical output to DC electrical power prior to transmission along the DC bus 110. Based on the configuration of a downstream electrical component receiving power from the DC bus 110, an inverter 112 may be used to convert the DC electrical power to AC electrical power. In one embodiment of locomotive 100, a single inverter 112 may supply AC electrical power from the DC bus 110 to a plurality of components. In an alternate embodiment, each of a plurality of distinct inverters may supply electrical power to a distinct component. It will be appreciated that in still further embodiments, the locomotive may include one or more inverters connected to a switch that may be controlled to selectively provide electrical power to different components connected to the switch.

A traction motor 120, mounted on a truck 122 below the main engine housing 102, may receive electrical power from alternator 108 via DC bus 110 to provide tractive power to propel the locomotive. As described herein, traction motor 120 may be an AC motor. Accordingly, an inverter paired with the traction motor may convert the DC input to an appropriate AC input, such as a three-phase AC input, for subsequent use by the traction motor. In alternate embodiments, traction motor 120 may be a DC motor directly employing the output of the alternator after rectification and transmission along the DC bus. One example locomotive configuration includes one inverter/traction motor pair per wheel axle 124. As depicted herein, six inverter-traction motor pairs are shown for each of six axle-wheel pairs of the locomotive. In alternate embodiments, locomotive 100 may be configured with four inverter/traction motor pairs, for example. It will be appreciated that alternatively a single inverter may be paired with a plurality of traction motors.

Traction motor 120 may also be configured to act as a generator providing dynamic braking to brake locomotive 100. In particular, during dynamic braking, the traction motor may provide torque in a direction that is opposite from the torque required to propel the vehicle in the rolling direction thereby generating electricity. At least a portion of the generated electrical power may be routed to an electrical energy storage device, depicted herein as battery 114. When the energy storage device is unable to receive and/or store all of the dynamic braking energy, the excess energy may be routed to a grid of resistors 126 and dissipated as heat. In one example, the grid includes stacks of resistive elements connected in series directly to the electrical bus. The stacks of resistive elements may be positioned proximate to the ceiling of main engine housing 102 in order to facilitate air cooling and heat dissipation from the grid. In addition, during periods when the engine 106 is operated such that it provides more energy than is needed to drive the traction motors 120, the excess capacity (also referred to as excess prime mover power) may be optionally stored in battery 114 or alternatively in a combination of energy storage devices including a plurality of batteries, ultracapacitors, and flywheels Thus, the energy storage device may be charged at times other than when the traction motors are operating in the dynamic braking mode. Air brakes (not shown) making use of compressed air may also be used by locomotive 100 as part of a vehicle braking system.

A multitude of motor driven airflow devices may be operated for temperature control of locomotive components. For example, a traction motor blower to cool traction motor 120 during periods of heavy work, an alternator blower to cool alternator 108, and a grid blower to cool the grid of resistors 126. Each blower may be driven by an AC or DC motor and accordingly may be configured to receive electrical power from DC bus 110 by way of a respective inverter.

Engine temperature is maintained in part by a radiator 118. Water may be circulated around engine 106 to absorb excess heat and contain the temperature within a desired range for efficient engine operation. The heated water may then be passed through radiator 118 wherein air blown through the radiator fan may cool the heated water. A cooling system comprising a water-based coolant may optionally be used in conjunction with the radiator 118 to provide additional cooling of the engine 106. The airflow devices and/or cooling system may also be used to cool the energy storage devices.

A system electrical energy storage device, depicted as battery 114 in this example, may also be linked to DC bus 110. A DC-DC converter (not shown) may be configured between DC bus 110 and battery 114 or alternate energy storage devices, including ultracapacitors, to allow the high voltage of the DC bus (for example in the range of 1000V) to be stepped down appropriately for use by the battery (for example in the range of 12-75V) or an appropriate voltage of the alternate energy storage devices. In the case of a hybrid locomotive, the on-board electrical energy storage device may be in the form of high voltage batteries, such that the intermediate DC-DC converter may be omitted.

Battery 114 may be charged by running engine 106. Alternatively, battery 114 may be charged during regenerative braking. The electrical energy stored in the battery may be used during a stand-by mode of engine operation to operate various electronic components such as lights, on-board monitoring systems, microprocessors, processor displays, climate controls, and the like. In hybrid locomotives, or other hybrid electric propulsion systems, the electrical energy stored in the battery or alternate energy storage devices, may also be used to motor the vehicle. Additionally, battery 114 may be used to provide energy to crank and start-up engine 106 from a shut-down condition.

While in the depicted example the energy storage device includes a battery, in alternate embodiments, the electrical energy storage device may be an energy storage system comprising a plurality of energy storage banks 115. The storage banks may include, for example, super-capacitors or ultracapacitors, flywheels, batteries, or a combination thereof. The storage banks may be used separately or in any combination. When in combination, the different storage banks may provide synergistic benefits not realized with the use of any single energy storage device. For example, a flywheel system can store electrical energy relatively fast but may be relatively limited in its total energy storage capacity. Similarly, an ultracapacitor system can store electrical energy relatively fast but may be relatively limited in its total energy storage capacity. On the other hand, a battery system stores energy relatively slowly but may be configured with a large total storage capacity. Thus, when combined, the flywheel and/or ultracapacitor may capture the dynamic braking energy that cannot be timely captured by the battery, while the energy stored in the flywheel or ultracapacitor may thereafter be used to charge the battery. In this way, the overall storage and capture capabilities of the energy storage system are extended beyond the limits of either the flywheel or the battery operating alone.

It will be appreciated that the plurality of energy storage banks may be located on the same locomotive or on an alternate locomotive. Further still, alternate energy sources 117 may be used to transfer energy to the on-board energy storage device, such as battery 114. The alternate energy sources 117 and/or the energy storage banks may also be charged by the engine and managed by energy management system 116.

The energy rating of the battery, as indicated in ampere-hours or kilowatt-hours, may typically reflect the total energy stored in the battery, and not the useable energy. As such, a lower limit for the battery's state of charge (SOC), alternatively represented as a depth of discharge (DOD), may reflect the actual useable energy. In one example, the DOD may be 80% indicating that 80% of the total energy rating may be useable. A charging/discharging rate and/or a power transfer rate to and/or from battery 114 or ultracapacitor (not shown) may be adjusted by a control system, such as energy management system 116.

Energy management system 116 may additionally include power electronics, DC/DC converters or bi-directional boost converters, electrical coupling devices, contactors, and diodes. The bi-directional boost converter (not shown) that may be included in the energy management system 116 decouples the voltage of an alternate energy storage system, for example ultracapacitors or a second battery in an energy storage system comprised of a plurality of energy storage devices, from the battery 114 voltage. The energy management system 116 may be configured to receive data pertaining to the battery's operating condition, including but not limited to a battery state of charge (SOC), a battery temperature and temperature gradient, a frequency of usage, a number of charging/discharging cycles that have elapsed, a power transfer current and voltage, a total number of ampere hours in a charge mode, a total number ampere hours in a discharge mode, a total net ampere hours in a charge/discharge mode, total operating hours in charge/discharge mode, number of vehicle missions completed, vehicle distance traveled, elapsed time in operation, and the like. Further, an associated position identification system, such as a GPS, or data from Trip Optimizer™ software (see U.S. Publication No. 20070219680A1 dated Sep. 27, 2007), or an associated vehicle control system 128 may provide the energy management system with details of current and future mission profiles 130, including but not limited to grades, speed limits, curvature, and altitude. The energy management system 116 may also be configured to receive data pertaining to vehicle driving characteristics such as a vehicle speed, power, and a numerical manual driver aggressiveness parameter. An upper and a lower threshold for the charging/discharging rate and/or the desired state of charge may accordingly be adjusted responsive to a temperature, age, frequency of usage, efficiency, and other operating parameters of the battery, and further based on the vehicle's mission profile. As the mission and/or battery operating parameters change, the charging/discharging profile may be revised and updated.

FIG. 2 shows an example map 200 depicting alternate charging profiles for a given desired state of charge (SOC). As shown, map 200 comprises three charging profiles 202, 204 and 206 for a given battery. The battery may have a preset upper and lower threshold for a rate of charging ($ROC_{max}$ and $ROC_{min}$ respectively). If the battery is charged above $ROC_{max}$, over-heating and subsequent degradation of battery components may ensue, leading to degraded battery performance. If the battery is charged below $ROC_{min}$, accelerated charge dissipation may ensue, adversely affecting the battery's capacity. It will be appreciated that a similar map may be computed for alternate discharging profiles for a given desired state of charge.

The different charging profiles (202, 204, 206) differ principally in their rates of charging, and the duration of charging. It will be appreciated however that all three profiles provide substantially the same final state of charge, as may be calculated by the area under each curve. Charging profile 202 has the highest charging rate (as represented by the steepest slope), however it is charged for the shortest period of time. As one example, the energy storage device may be charged at 1000 kW for 15 mins to generate 250 kWh of charge. As such, charging profile 202 may be the default (unadjusted) maximum power transfer rate profile. Charging profile 202 may be selected, in one example, when a future charging opportunity of a shorter duration is available, when the battery has not aged much, when there is insufficient mission data and/or when an alternate charging profile is not feasible. As we move towards profile 206, via 204, the charging rate decreases while the charging duration increases. As one example, the energy storage device may be charged at 600 kW for 25 mins (as an example of profile 204) or at 250 kW for 60 mins (as an example of profile 206). Adjusted charging profiles 204 or 206 may be selected when, for example, a future charging opportunity of a longer duration is available, when sufficient mission data and history is available, and/or when the battery has aged and thus developed a high internal resistance such that charging at higher rates is detrimental to the battery's life.

It will be appreciated that while the depicted example indicates a common upper and lower limit for the rate of charging (ROC), in alternate embodiments, each charging profile may have independently assigned upper and lower limits for the rate of charging. The upper and lower thresholds for the desired state of charge may be adjusted responsive to, for example, a temperature and age of the energy storage device. Alternatively, the limits may be assigned responsive to the device's operating conditions. In one example, as a temperature and/or age of the device increases, by reducing the upper threshold and increasing the lower threshold for the target state of charge, excess heat generation in the device may be averted. Alternatively, the upper and lower threshold for the target SOC may be adjusted. When the energy storage device includes a plurality of energy storage banks, the maximum threshold for ROC and/or SOC for each individual bank may be independently adjusted responsive to the age, frequency of usage, and other performance affecting characteristics of the bank. Further, the power transfer rate of and between at least one of the plurality of energy storage banks may be adjusted responsive to an operating condition of the energy storage bank. In one example, this may be achieved by reducing the power transfer rate of the device as the temperature of the device increases, for the duration of the power transfer.

In this way, the power transfer profile of the energy storage device may be adjusted to maximize power transfer for the entire duration of each power transfer opportunity over the course of the mission. By reducing the frequency of power transfer at the maximum threshold of ROC, and by prolonging the duration of each energy excursion (when possible based on a priori information) an efficient power transfer may be achieved. By averting over-charging or over-discharging, an accelerated loss of cycle life may be prevented and a higher total lifetime performance of the energy storage device may be realized.

FIG. 3 shows an example map 300 depicting adjustments in the power transfer rate of a battery based on the estimated duration of future power transfer opportunities. The top graph indicates the duration of future charging and discharging opportunities while the lower graph illustrates changes in the power transfer profile for the duration of each respective power transfer opportunity. A control system may be configured to adjust the power transfer rate of a current power transfer opportunity based on an estimated duration of a succeeding future power transfer opportunity, where the current power transfer opportunity immediately precedes the succeeding power transfer opportunity. As such, adjusting the power transfer rate may include adjusting a power transfer current value, a power transfer voltage value, or a combination thereof. The same may be extrapolated for a plurality of future power transfer opportunities, for example for all the future power transfer opportunities in the given mission. In the depicted example, the duration between time points $t_1$ and $t_2$ represents a future shorter duration charging opportunity $C_1$ and the duration between time points $t_3$ and $t_4$ represents a future longer duration charging opportunity $C_2$. As such, in a mission, charging and discharging opportunities will alternate. As depicted in this example, the short duration charging opportunity is preceded by a longer duration discharging opportunity ($D_1$ from time point 0 to $t_1$) and the long duration charging opportunity is preceded by a shorter duration discharging opportunity ($D_2$ from time point $t_2$ to $t_3$). $SOC_{des}$ represents a target SOC that may be desired at the end of each charging opportunity. $SOC_{min}$ represents a predetermined lower threshold for the battery's SOC that may ensure a healthy battery. As depicted, the target SOC ($SOC_{des}$) may be dynamically adjusted responsive to the duration of the charging opportunity, the rate of charging, ambient conditions, a condition of the battery, such as a battery age, or combinations thereof. However, it will be appreciated that in alternate embodiments, a predetermined fixed target SOC may be selected. In the same way, while the depicted example shows a fixed predetermined lower threshold for the battery's SOC ($SOC_{min}$), the threshold may alternatively be dynamically adjusted responsive to the duration of the discharging opportunity, the rate of discharging, ambient conditions, battery conditions, or combinations thereof. As such, the initial SOC preceding a charging opportunity, that is a target SOC desired at the end of each preceding discharging opportunity, may be varied responsive to the duration of the discharging opportunity and its ensuing charging opportunity. The target SOC may be $SOC_{min}$ or may be assigned a value in between $SOC_{min}$ and $SOC_{des}$, where $SOC_{des}$ represents an upper threshold for the battery SOC.

During discharging opportunity $D_1$, the energy management system may assign a discharging profile 302 to the battery. The profile may be based on an a priori knowledge that $D_1$ is a longer duration discharging opportunity that is followed by a shorter duration charging opportunity. A target state of charge to be obtained at the end of $D_1$ ($SOC_{d1}$) may consequently be back calculated. Thereafter, the discharging profile 302 may be adjusted to proceed at a sub-maximal discharging rate such that the target state of charge may be obtained at the end of the longer duration discharging opportunity, but not earlier. It may be determined that the ensuing shorter duration charging opportunity $C_1$ is too short for a profile adjustment and as such, a default (unadjusted) maximum power transfer rate may be used at that time. Based on the duration of the charging opportunity, and/or other battery conditions, a target state of charge to be obtained at the end of $C_1$ ($SOC_{c1}$) may also be back calculated. In one example, the battery may be an older battery. Thus, when charging the older battery at the maximum power transfer rate, the target SOC selected ($SOC_{c1}$) may be lower then the maximum value ($SOC_{des}$) to avoid battery degradation. In another example, when the battery is a newer battery, the fixed upper threshold target SOC ($SOC_{des}$) may be selected. Further, $SOC_{d1}$ may be calculated to a value such that $SOC_{c1}$ may be attained when charging the battery at the maximal rate for the duration of $C_1$. Thus, charging profile 304 may represent the maximal power transfer profile. In this way, as the estimated duration of the succeeding future power transfer opportunity decreases, the power transfer rate in the preceding power transfer opportunity may be adjusted to achieve a higher target state of charge.

In contrast, when it is determined that $D_2$ is a shorter duration discharging opportunity that is followed by a longer duration charging opportunity $C_2$, a lower target state of charge to be obtained at the end of $D_2$ ($SOC_{d2}$) may be calculated. As depicted, $SOC_{d2}$ may be as low as $SOC_{min}$, but not lower. Further, since the duration of $D_2$ is small, it may be desirable to discharge the battery at the default (unadjusted) maximal discharging rate, as depicted by discharging profile 306. In the ensuing charging opportunity, $C_2$, based on the longer duration of charging available, the power transfer rate and target SOC to be obtained at the end of $C_2$ ($SOC_{c2}$) may be appropriately calculated. The power transfer profile 308 for $C_2$ may accordingly be adjusted to a sub-maximal value. Given that the charging opportunity duration is longer, and the rate of charging to be used is lower, a higher target SOC ($SOC_{c2}$) may be selected, to additionally take advantage of the beneficial effects of slow charging on battery life. Thus $SOC_{c2}$ may be attained slowly between t3 and t4, but not earlier. In this way, as the estimated duration of the succeeding future power transfer opportunity increases, the power transfer rate in the preceding power transfer opportunity may be adjusted to achieve a lower target state of charge.

It will be appreciated that as the battery goes through the plurality of charging and discharging phases, the battery chemistry also goes through multiple battery state phases. As such, some of those charging and discharging phases may render the battery in a state of charge that may be detrimental to the life and performance of the battery. In one example, there may be a specified state of charge (or state of charge range) at which if the battery is left for a prolonged period, the battery chemistry may cause accelerated battery damage. Herein, accelerated battery damage may be averted by transiently increasing a battery rate of charging when transitioning the battery through that state of charge (or state of charge range) to minimize time spent in that state of charge, and then returning to the optimized battery charging profile. In another example, there may be a specified state of charge (or state of charge range) at which if the battery is left for a prolonged period, the battery chemistry may improve battery life. Herein, battery life may be extended by transiently decreasing a battery rate of charging when transitioning the battery through that state of charge (or state of charge range) to maximize time spent in that state of charge, and then returning to the optimized battery charging profile. In this way, by purposefully exercising the battery rapidly or very slowly through a series of charging/discharging events or specific SOC swings, the condition of a battery may be improved and its life extended. In the same way, to reduce known and anticipated detrimental effects of upcoming charging/discharging opportunities on a battery whose age, and other performance affecting conditions are known, the power transfer profile and/or target SOC may be appropriately dynamically adjusted. As such, when adjusting the power transfer profile, the electrical current and/or voltage values for power transfer to/from the battery may be adjusted. In this way, current and voltage values that may adversely affect the life and performance of the battery may be avoided.

Thus, the power transfer profile and the initial and target SOC for each future power transfer opportunity may be customized responsive to the duration of the opportunity, and/or battery conditions. By planning such power transfer profiles for each opportunity, power transfer over the course of the mission may be optimized while improving the life of the battery. It will be appreciated that while in this example, the target SOC at the end of each charging opportunity is set to $SOC_{des}$, in alternate examples the target SOC for each charging opportunity may vary and/or may be independently assigned.

FIG. 4 depicts a power transfer profile routine 400 that may be performed by a microprocessor of the energy management system 116, or a locomotive control system, to determine a battery power transfer profile for each future power transfer opportunity of the mission. The routine allows a desired high limit SOC to be achieved at the end of an upcoming charging opportunity, but not earlier, by reducing the charging current and/or power level at the start of a charging opportunity. A control system may be configured to perform routine 400 to adjust the power transfer rate of an energy storage device based on an estimated duration of a future power transfer opportunity, such that, if the estimated duration of the future power transfer opportunity is greater than a predetermined threshold, the power transfer rate of the future transfer opportunity may be reduced. As such, the adjusted power transfer rate may include an adjusted power transfer current, power transfer voltage, or a combination thereof. The control system may also be configured to perform routine 400 to adjust the power transfer rate of a current power transfer opportunity based on the duration of the current power transfer opportunity. In one example, a future longer-duration charging opportunity may be available wherein charging at the maximum current level for the duration would result in overcharging of the battery. Herein, prior to the charging opportunity, the upper limit of the charging profile may be lowered and the charging rate may be adjusted such that a desired state of charge may be achieved only at the end of the charging opportunity, when charging at the adjusted lower rate, but not earlier. Additionally or optionally, if feasible, the battery may be discharged to a desired initial lower state of charge prior to the long-duration charging opportunity such that a desired final state of charge may be achieved only at the end of the charging opportunity, when charging at the maximum current level, but not earlier. In another example, a future shorter-duration charging opportunity may be available wherein charging at the maximum current level for the duration would not result in overcharging of the battery. Herein, prior to the charging opportunity, the upper limit of the charging profile and the charging rate may remain unadjusted such that the desired state of charge may be achieved only at the end of the shorter duration opportunity, but not earlier. Additionally or optionally, if feasible, the battery may be discharged to a desired initial higher state of charge prior to the short-duration charging opportunity. In this way, the amount of energy captured during each charging opportunity may be maximized while optimizing battery life.

The mission may be conceptually divided into two kinds of phases, namely a charging phase and a discharging phase. During the charging phase, the battery may be charging (with the possibility of optional quiescent periods) while during the discharging phase, the battery may be discharging with optional quiescent periods. It will be appreciated that charging and discharging phases may alternate. The energy management system 116 may be configured to specify where the discharging energy is to be directed during active operation. In one example, it may be desirable to apply the discharging energy to motoring the vehicle. In another example, when operating with multiple energy storage banks, it may be more desirable to store the energy discharged from one bank in an alternate bank. Since motoring power usage is highly variable and not directly controlled by the energy management system, using alternate storage banks as a storage sink for the discharged energy allows the discharging to be done in a controlled manner. In another example, when no alternate option is available, the discharging energy may be dissipated through the grid of resistors. The energy management system may also specify where the charging energy is obtained from. While in one example, the charging energy may be obtained from regenerative braking energy (in bursts), in alternate examples, the charging energy may be obtained from the engine or, in a more controlled manner, from another available energy storage bank.

At 402, a maximum change in the state of charge ($\Delta Q_i$) for the current mission phase (phase i) may be determined. The energy management system may strive to compute a change in the state of charge (SOC) with the largest magnitude. As such, $\Delta Q_i$ may represent an amount of charge by which the battery state could be changed if the battery accepted the maximum current or power profile that the vehicle system could supply, when operating on the mission. Further, if the current mission phase is a charging phase, then $\Delta Q_i$ may be assigned a positive value. If the current mission phase is a discharging phase, then $\Delta Q_i$ may be assigned a negative value.

In one example, the maximum change in the SOC may be determined based on a history and/or statistical analysis of the same vehicle when previously traversing the same mission. Alternatively, it may be based on the history of the same vehicle when previously traversing similar missions. It will be appreciated that in alternate embodiments, the maximum change in the SOC may be computed based on the history of other vehicles traversing the same mission, or based on a statistical average of other vehicles traversing similar missions. The database of route profiles may include details pertaining to grades, speed limits, altitudes and curvatures. The estimated train speed and power may also be based on driving characteristics, such as a numerical manual driver aggressiveness parameter which quantifies the driver's tendency towards fuel or time optimization. The history and relevant statistical data may be pre-computed and available in a database easily accessible by the energy management system en route the mission. By comparing the current locomotive position to the database of previous comparable locomotive consist powers and notch histories, a time duration of the upcoming charging or discharging opportunity may be determined. A compensation factor may be computed to compensate for differences in speed restrictions, dispatch details, and the like. The database may be an on-board database (for example as part of the energy management system 116 or as part of a connected on-board locomotive control system) or a remote database.

The maximum change in the SOC may be computed at the time of the mission either on-board or off-board based on one or more operating constraints including, but not limited to, the vehicle's payload, tare weight, mean fuel consumption, projected fuel consumption, current fuel consumption, past fuel consumption, mission terrain, location, speed limits, desired speed profile, traffic congestion parameters, number of delivery stops, anticipated stationary time, desired time to traverse the current phase, or any combination thereof. It will be appreciated that in alternate embodiments, a measure of the energy consumed may be chosen, in lieu of or in addition to, a measure of the fuel consumed. A buffer time may be subtracted from the calculated charging/discharging opportunity to account for variability between the current mission and the database. It will also be appreciated that a set of statistical parameters may be determined for the particular class of mission (for example classifications based on territory, locomotive payload type, or locomotive priority) to drive a probabilistic forecast of the charging/discharging opportunities.

At 404, a target SOC ($Q^*_i$) to be attained at the end of the current phase (phase i) may be determined. In doing so, a target value for what the battery is expected to achieve over the next phase is assigned. The battery may be charged or discharged to a desired SOC by the end of the current phase in order to enable an optimal discharging or charging in the next phase.

In one example, the current phase (i) is a discharge phase. Accordingly, a maximum SOC attainable in the next phase ($\Delta Q_{i+1}$) may be determined prior to assigning a target SOC at the end of the discharge phase ($Q^*_i$). The maximum SOC attainable may be determined based on known or deduced mission characteristics, as previously elaborated. Since the next phase is a charging phase, the maximum SOC attainable ($\Delta Q_{i+1}$) has a positive value. To ensure that sufficient battery uncharged capacity is available at the beginning of the next phase (i+1), to enable the battery to accept all of the maximum attainable SOC ($\Delta Q_{i+1}$) in that phase, the target SOC desired at the end of the current discharge phase ($Q^*_i$) may be computed using the following equation:

$$Q^*_i \leq 100\% - \Delta Q_{i+1}$$

For example, if the maximum charge attainable charge in the following charging phase is 60%, the battery may be discharged over the current phase to attain a target SOC of no more than 40%, thereby ensuring complete charging of the battery by the end of the next phase. While in this example a target SOC is determined based on the charging/discharging opportunities available one phase ahead of the current phase, it will be appreciated that in alternate examples, it may be desirable to look N phases ahead, or at all the phases until the end of the mission. If looking at N phases ahead, a target SOC at the end of phase i+N may be calculated first, and then the maximum attainable SOC and the target SOC for all the previous phases may be computed by working backwards through the phases one-by-one. If looking at all phases until the end of the mission, a target SOC at the end of the last phase ($i_{max}$) may be calculated first, and then the maximum attainable SOC and the target SOC for all the previous phases may be computed by working backwards through the phases one-by-one.

In yet another example, a target SOC may be determined for the end of an equalization charging phase. The equalization phase may be used for equalizing charge in individual cells of a battery system, or for equalizing charge among different energy storage banks. As such, it may be desirable to apply a standard current profile for battery reconditioning, equalization, SOC resetting, or other battery maintenance purposes, in the next phase. Accordingly, an amount of SOC "headroom" required in the next phase (i+1) to perform the appropriate battery reconditioning, equalization or resetting may be calculated, or determined from a data lookup table. This value may then be used to set the target SOC for the current phase ($Q^*_i$) to ensure that the headroom requirement is met.

In still another example, a target SOC may be determined to prepare the battery for a low emissions discharge phase of the locomotive or other vehicle. This may be selected when it is desired to run a segment of the mission in a low emission mode. As such, a low emissions mode may be chosen for example when travelling through an urban "green zone" area, a low-engine-noise area, an emissions non-attainment zone, during a stealth segment of a quasi-military mission, or when travelling through a tunnel where combustion engine operation is severely curtailed. Accordingly, the target SOC before the low-emissions phase is adjusted to a high enough value to enable the battery to provide a large portion of the vehicle's energy requirements, thereby reducing or eliminating use of the combustion engine.

At 406, it is determined if there is any flexibility in the battery current level in the operating phase (phase i). In other words, it is determined if when applying the maximum charging current profile (the default charging current profile) for the computed maximum SOC change ($\Delta Q_i$) in the current phase, whether the target ending SOC ($Q^*_i$) will be overshot or not. In one example, this may be calculated based on the value of a present SOC ($Q_0$) by comparing $Q_0+\Delta Q_i$ with $Q^*_i$. However, it will be appreciated that alternate methods and additional constraints may be used to determine whether the maximum current profile should be used or not. If there is no flexibility in the battery current level, then at 408, the unadjusted current profile (that is, the default maximum charging current profile) may be used in phase i.

If there is flexibility in the battery current level in phase i, then at 410, the battery current profile may be adjusted, as previously elaborated, to avoid overshooting the target SOC. By applying an adjusted less intense current profile, a large number of benefits may be achieved. Specifically, an extension of battery life, a reduction in heating of battery components, and a reduction in the stress on other vehicle system components may be achieved through the use of a sub-maximal current profile.

In one example, the charging profile may be accurately computed and adjusted to a lower level until the target SOC ($Q^*_i$) is delivered, as depicted in FIG. 2. In another example, the current profile reduction may not be accurately computed to meet the target SOC exactly, but instead the maximum current profile may be reduced by an approximate amount, such as a predetermined amount or by a predetermined factor. The predetermined amount or factor may have been assigned based on details in the history database of the vehicle and/or the mission.

In still another example, the current profile may be reduced only during the initial parts of the phase to reduce internal heating of the battery and also to give the battery an opportunity to be cooled down (or be heated up less) to a lower temperature. Additionally, the current profile may be adjusted in the final parts of the phase so as to allow the battery to be operating at a lower temperature when entering the next phase. As such, the default maximum charging current profile may be used for the remainder of the phase. It will be appreciated that it may be desirable to perform the bulk of the current profile reduction during the initial parts of the phase in order to preserve some degree of flexibility for making more adjustments at the tail end of the phase in response to unanticipated changes in the mission.

At 412, it is determined if any additional battery performance compensation is required, based on the operating condition of the battery. If yes, then a performance-adjusted routine 500, as further elaborated in FIG. 5 may be performed at 414. If no compensation is required, then at 416, it is determined if there is a change in the mission. If yes, then a mission-adjusted routine 600, as further elaborated in FIG. 6 may be performed at 418. It will be appreciated that the mission change may include changes or updates in the vehicle or payload, mission route, mission schedule, energy storage system (device and/or banks) health, or any combination thereof that may affect the power transfer profile at the current and/or future power transfer opportunity. If there is no change in the mission, then at 420, the routine may proceed to the next phase and a next iteration of routine 400. Before proceeding to the next phase, the routine may update information regarding the mission profile and adjustments made to the energy management system, or to a vehicle control system for use in planning future opportunities. In this way, by keeping track of prior charging states and upcoming charging/discharging events, battery life, useable capacity and peak power usage may be optimized, and further still, degraded performance may be repaired.

It may be desirable to always bring the battery to a top state of charge given that allowing the battery to sit at a low SOC causes battery component degradation, for example due to ripening of NaCl crystals in metal-halide batteries. Accordingly, the battery may be brought to a top state of charge using the engine if it is unattainable using the regenerative braking opportunity. If a braking cycle instead of a discharge cycle is the next phase to arrive in a mission, the battery may be purposefully discharged down to a desired SOC just prior to the braking event.

The power transfer profile routine 400 of FIG. 4 may also be applied to on-highway hybrid vehicles such as hybrid trucks that drive over specific routes (for example an interstate highway system) wherein their location may be determined by a position information device such as a GPS (Global Positioning System) device. Such vehicles may experience additional variation in their driving speed due to changes in traffic conditions as compared to vehicles that operate on prescribed routes, such as locomotives operating on rails. These additional variations may utilize constant monitoring and additional compensatory adjustments.

FIG. 5 depicts a performance adjustment routine 500 that may be performed at 414 of routine 400. Herein, the power transfer profile, as initially established in routine 400, may be adjusted in consideration of a plurality of battery performance affecting parameters. These parameters may be dependent on the operating condition of the battery, or, in the case of a plurality of energy storage banks, the operating condition of individual storage banks. The parameters may include, but not be limited to, an age of the device, an operating temperature of the device, the frequency of usage, the number of charging/discharging cycles that have elapsed, the total hours of operation of the device, and combinations thereof. By adjusting the power transfer profile while compensating for performance affecting parameters, the operating life of the device may be extended and the performance improved.

At 502, an initial charging profile is established, for example by performing power transfer profile adjustment routine 400. At 504, a current battery temperature gradient ($\Delta$temperature/$\Delta$time, or dT/dt) may be determined. As such, the battery temperature gradient may be used to assess a battery condition, for example an age, an internal resistance, and/or a discharge current of the battery. The battery temperature gradient may be continually monitored and the data stored in a lookup table along with the specific geographic location details and the battery current profile.

At 506, it is determined whether an increase in the battery temperature gradient is expected in the current phase (i). In one example, during periods where the battery discharge current is expected to be relatively high, for example when climbing a specific grade between known GPS locations, or when assisting the engine's prime mover power during acceleration with additional required tractive power, or when trying to meet promised fuel savings, the sensed battery temperature gradient may be expected to increase. If the battery temperature gradient is expected to increase, then at 508, the battery cooling system may be operated in anticipation of the temperature rise. Additionally, the initial charging profile may be compensated based on the battery cooling system conditions. Conditions of the battery cooling system including but not limited to a battery temperature, an ambient temperature, a coolant temperature, and a switch on/off position, may be monitored and stored in a lookup table (for example along with the battery temperature gradient) or on trending files of an associated microprocessor's memory. In the event that battery cooling is "off", no correction factor may need to be applied to the battery current profile. However, in the event that battery cooling is "on", a compensation factor ($C_{temp}$) may be applied to the battery current profile to account for the cooling. If no increase in battery temperature gradient is expected, then the routine proceeds to 510.

At 510, it is determined whether the current temperature gradient is above a predetermined threshold. This may occur, for example, as a battery ages. When batteries age, their internal resistance grows and thus for the same state of charge and the same current level, an aged battery tends to have higher heat generation. If the temperature gradient at 510 is above the threshold, then at 512 a new lower maximum limit for the power transfer current may be assigned. As such, this may lead to incomplete charging of the battery and an increase in the amount of total power contributed by the engine to attain the top SOC. The ensuing decrease in the amount of fuel saved in the hybrid vehicle may however be offset by an increase in the usable life of the battery.

At 514, the performance adjustment routine may determine whether the age of the battery is above a predetermine threshold. In one example, the age of the battery may be estimated from the end of life (EOL) of the battery. In another example, the age may be estimated by monitoring the temperature gradient of the battery. An end of life of the battery may be determined when the battery no longer meets its performance requirements. In one example, the EOL of a battery may be defined when the usable stored energy capacity falls to 80% of the nominal value. Alternatively, the EOL of the battery may be deduced from its total number of operating hours, number of vehicle missions completed, distance traveled by the vehicle, vehicle fuel consumption, battery internal resistance, etc. As such, the loss of performance in aged batteries is due to incremental damage sustained during each operational cycle. Moreover, when it is attempted to charge or discharge the battery with more energy than its capacity at that time, the loss of life is greatly accelerated. Accordingly, as a battery approaches its end of life, if the operating cycle experiences an occasional surge in energy transfer, the likelihood of the battery operating outside its now-reduced capacity range increases, with a higher likelihood of accelerated loss of remaining life. Therefore, if the age of the battery is above the threshold, then at 516 a battery age-dependent compensation factor ($C_{age}$) may be determined, else the routine continues to 518. It will be appreciated that as the batteries age and their internal resistance increase, it may also be desirable to assign a lower $ROC_{max}$ and a higher $ROC_{min}$ (see FIG. 2) and to accordingly further lower the power transfer rate of the battery.

It will also be appreciated that while the above described temperature gradient based adjustments have been described for discharging operations, the same may be applicable for charging operations during downhill grades or during deceleration of the vehicle. Further, when charging high temperature sodium type batteries, an additional compensation amount may be required during specific ranges of the battery's state of charge since charging in these regions may cool the batteries and reduce the effect of any internal resistance based heat.

At 518, it is determined whether any other performance affecting parameter is present. In one example, based on the knowledge of the battery's operational chemistry, it may be determined that the selected power transfer profile may have a detrimental effect on the life of the battery. If so, then at 520 a corresponding battery performance compensation factor ($C_{misc}$) may be computed. It will be appreciated that in alternate embodiments, in addition to (or in lieu of) computing a compensation factor to affect the power transfer profile, the target SOC to be attained at the end of the power transfer opportunity may be adjusted responsive to the performance affecting parameters. In this way, compensation factors may be computed for each individual performance affecting parameter. In one embodiment, pre-computed compensation factors may be read from a lookup table configured in the energy management system. When the energy storage device includes a plurality of energy storage banks, individual compensation factors may be computed for each storage bank, responsive to their respective operating conditions.

At 522, the initially established power transfer profile is adjusted by updating the power transfer rate with the compensation factors for age, temperature, internal resistance etc., as calculated at 508-520. In this way, by adjusting the power transfer profile for an energy storage device responsive to factors that may affect the performance of the device, the power transfer process may be made more efficient while extending the life of the device.

FIG. 6 depicts a mission-adjustment routine 600 that may be performed in addition to routines 400 and 500 to adjust an initial power transfer profile responsive to sudden changes in the mission. By adjusting the power transfer profile of a battery responsive to operating parameters as well as mission characteristics, the charging/discharging opportunities of a mission can be used to a maximum advantage while optimizing the usage characteristics of the battery.

At 602, an initial charging profile is established. This may be established by performing charging profile routine 400, as previously elaborated in FIG. 4. Further, a base architecture may be established. As previously mentioned, in one embodiment, the energy storage device may include a plurality of energy storage banks. In one example, the base architecture of the energy storage device may comprise at least two battery systems wherein each battery system is adjusted en bloc. It may be desirable to configure the batteries in the base architecture such that at least one battery system has the added ability to complete charging via an alternate approach in the event of a mission change. In one example, the alternate charging approach may include charging a first battery system by transferring energy from a second battery system, said first and second battery systems coupled to the same locomotive. As such, the second battery system may function as an emergency back-up system for the first battery system, used only in the event of a sudden mission change. The second battery system, after transferring charge to the first battery system, may be recharged from a second energy source, such as the prime mover power. Alternatively, a second prime mover power (on the same or a different locomotive), or an auxiliary mover power, may be used to complete the charging of the second battery system. In still another example, at least one traction motor may be used to charge the second battery system via dynamic braking while the remainder of the traction motors may be employed for motoring the locomotive. It will be appreciated that transfer of charge between energy storage banks may consider the rating, age and/or remaining life of the storage bank. In one example, it may be desirable to transfer charge from the energy bank with a higher rating/higher cycle life/lower age to the energy storage bank with the lower rating/lower cycle life/greater age. Further, the power transfer rate between storage banks may also be adjusted responsive to the age and capacity of each individual storage bank. By cycling individual energy storage banks responsive to their age and capacity, the operating period of lower cycle life energy storage banks may be extended, thereby extending the period of time before which the energy storage system requires maintenance and/or replacement.

At 604, it is determined whether there has been a change in mission resulting in a change in the charging profile. If there has been no change in the mission, then the routine may end. As such, a change in mission may include changes or updates in the vehicle or payload, mission route or schedule, and/or health of the energy storage system (device or banks). Such changes may be of an emergency or non-emergency nature. Based on such information, it may be further possible to customize the power transfer profile for each future power transfer opportunity. In one example of a sudden change in mission, the consist of locomotives hauling a train may change, thereby changing the available tractive effort and power to propel and brake the train and/or the total amount of available energy for storage. In another example, the payload, such as a number of loaded railcars may be increased or decreased as the train proceeds along its mission, and analogously for a refuse truck operating along its route, the payload may increase or decrease. In either case, as the payload changes, changes in the propulsion and braking power required may vary. In yet another example, a train may be rescheduled to avoid rail network congestion or to effect a crew change. In the same way, a road vehicle may encounter congestion or changed speed limits due to poor weather conditions. In still another related situation, the vehicle route may be changed in response to congestion or updated load pick-up or drop-off requirements. Alternatively, analysis of the behavior of the energy storage system or a part of the energy storage system may result in updated data on its state-of-health, including operating power and stored energy limits, which may affect the capability of the energy storage system to respond to future charging and discharging opportunities.

If there has been a change in mission, then at 606, it is determined whether the new mission is of an emergency nature or not. If the new mission is not an emergency, at 608 the charging profile may be appropriately adjusted (for example using duration of opportunity-responsive adjustments performed in routine 300) in order to deal with the mission change and a note regarding the result may be updated in the charging profile history.

If the mission is an emergency, at 610, a new architecture may be calculated. In one example, an emergency mode architecture may have been deduced previously, based on data from prior emergency missions of the same vehicle or similar vehicles, and the result may be stored in a lookup table. The new architecture may require reconfiguring of the battery system into at least two battery sub-systems with differing charge rating. In one example, the battery system may be operating at 10 MWh. During a mission change event, the battery system may be split into a 3 MWh and a 7 MWh sub-system wherein the 3 MWh sub-system may be configured to complete charging and the 7 MWh sub-system may be configured to not complete charging. In another example, if the battery system is in a critical state, that is, if the charge interruption is damaging to the battery system, then the battery system may be split and one sub-system may be charged by discharging the other sub-system. Thus, in the event of an emergency mission change, the control system may be configured to address future power demands by differentially charging the energy storage banks, for example by differentially transferring energy between the banks. At 612, it is verified whether the new architecture is feasible under the current mission conditions. If not feasible, then at 614, no changes are made to the charging architecture and a revitalization of the battery may be scheduled. If the new architecture is feasible, then at 616, the charging architecture may be changed and the results of the change may be updated in the charging profile history. In this way, by adjusting the battery power transfer rate based on future charging/discharging opportunities, and by further adaptively adjusting the power transfer profile responsive to previous performances, the battery's life and capacity may be optimized, thereby extending the life and health of the energy storage device.

Though exemplary embodiments of the present invention are described herein with respect to locomotives and other vehicles, it is also applicable to powered systems generally, including stationary power generation systems. Towards this end, when discussing a specified mission, this includes a task or requirement to be performed by the powered system. In the case of stationary applications, e.g., a stationary power generation station having one or more generators, or a network of power generation stations, a specified mission may refer to an amount of wattage or other parameter or requirement to be satisfied by the power generation station(s), alone or in concert, and/or estimated or known opportunities to store excess power from a power grid, electrical bus, or the like. In the case of a diesel-fueled power generation system (e.g., a diesel generator system providing energy to an electrical energy storage system), operating conditions may include one or more of generator speed, load, fueling value, timing, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of controlling a power transfer rate in to and/or out of a vehicle energy storage device to affect a current state of charge of the energy storage device during a mission of the vehicle, the mission comprising a plurality of future power transfer opportunities, the method comprising:
controlling the power transfer rate into the vehicle energy storage device from a generator disposed onboard the vehicle; and adjusting the power transfer rate based on an estimated duration of a future power transfer opportunity.

2. The method of claim 1 wherein if the estimated duration of the future power transfer opportunity is greater than a predetermined threshold, reducing the power transfer rate at the future power transfer opportunity.

3. The method of claim 1 wherein if the estimated duration of the future power transfer opportunity is different from a predetermined threshold, changing the power transfer rate at the future power transfer opportunity.

4. The method of claim 1 further comprising: adjusting the power transfer rate of a current power transfer opportunity based on an estimated duration of the current power transfer opportunity.

5. The method of claim 1 wherein adjusting the power transfer rate based on the estimated duration of the future power transfer opportunity further comprises:
adjusting the power transfer rate of a current power transfer opportunity based on an estimated duration of a succeeding, future power transfer opportunity, where the current power transfer opportunity immediately precedes the succeeding future power transfer opportunity.

6. The method of claim 5 wherein adjusting the power transfer rate of the current power transfer opportunity includes:
as the estimated duration of the succeeding, future power transfer opportunity increases, adjusting the power transfer rate in the preceding, current power transfer opportunity to achieve a first target state of charge at the end of the current power transfer opportunity; and
as the estimated duration of the succeeding, future power transfer opportunity decreases, adjusting the power transfer rate in the preceding, current power transfer opportunity to achieve a second target state of charge at the end of the current power transfer opportunity, said second target state of charge being higher than said first target state of charge.

7. The method of claim 1 where the vehicle is a locomotive, the method further comprising adjusting the power transfer rate in response to variation of the duration of the opportunity or based on a change in vehicle mission.

8. The method of claim 1 where the energy storage device is at least one of a battery, flywheel and ultracapacitor.

9. The method of claim 1 where the energy storage device is an energy storage system comprising a plurality of energy storage banks.

10. The method of claim 9 where the plurality of energy storage banks includes batteries.

11. The method of claim 1 further comprising: adjusting the power transfer rate of the energy storage device at a current power transfer opportunity and adjusting the power transfer rate at a future power transfer opportunity responsive to an operating condition of the energy storage device.

12. The method of claim 9 further comprising: adjusting the power transfer rate of at least one of the plurality of energy storage banks responsive to an operating condition of the energy storage bank.

13. The method of claim 12 wherein the operating condition is an age of the device.

14. The method of claim 12 wherein the operating condition is a temperature of the device.

15. The method of claim 14 wherein adjusting the power transfer rate responsive to a temperature of the device includes, as the temperature of the device increases, reducing the power transfer rate of the device at the future power transfer opportunity.

16. The method of claim 6 further comprising: adjusting an upper and a lower threshold for the first target state of charge responsive to a temperature and age of the energy storage device.

17. The method of claim 16 wherein adjusting an upper and a lower threshold includes, as a temperature and age of the device increases, reducing the upper threshold and increasing the lower threshold for the first target state of charge.

18. The method of claim 9 further comprising: in the event of a change in mission, differentially charging the energy storage banks.

19. The method of claim 18 wherein, differentially charging the energy storage banks includes, transferring power between the energy storage banks.

20. A system for controlling a power transfer rate into and/or out of an energy storage device of a locomotive, the system comprising:
an energy storage device disposed on the locomotive;
an electrical generator disposed on the locomotive; and
a control system coupled to the energy storage device and the generator, the control system configured to:
estimate a duration of a future power transfer opportunity, and adjust a power transfer rate to/from the energy storage device during a current power transfer opportunity to affect a current state of charge of the energy storage device based on the estimated duration of the future power transfer opportunity.

21. The system of claim 20 wherein the energy storage device comprises at least one of a battery, flywheel and ultracapacitor.

22. The system of claim 20 wherein the control system further adjusts the power transfer rate responsive to an operating condition of the energy storage device.

23. The system of claim 21 wherein, in the event of a change in a mission of the vehicle, the control system is further configured to differentially charge the energy storage device.

24. The system of claim 23 wherein differentially charging the device includes transferring power between energy storage banks.

* * * * *